United States Patent
Ravineau et al.

(10) Patent No.: US 8,216,035 B2
(45) Date of Patent: Jul. 10, 2012

(54) CLEANING SYSTEM FOR A CROP FLOW

(75) Inventors: Julien Ravineau, Déols (FR); Daniel Le Nevé, Challans (FR)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 13/138,039

(22) PCT Filed: Dec. 23, 2009

(86) PCT No.: PCT/EP2009/067853
§ 371 (c)(1),
(2), (4) Date: Aug. 9, 2011

(87) PCT Pub. No.: WO2010/072809
PCT Pub. Date: Jul. 1, 2010

(65) Prior Publication Data
US 2011/0306394 A1    Dec. 15, 2011

(30) Foreign Application Priority Data
Dec. 24, 2008   (FR) .................................. 08 07472

(51) Int. Cl.
A01D 45/00 (2006.01)
A01D 46/00 (2006.01)
B02B 3/08 (2006.01)

(52) U.S. Cl. ....................... 460/142; 460/143

(58) Field of Classification Search ............ 34/115, 34/108, 110, 122, 86, 126; 460/14, 142, 460/143, 134; 99/569; 209/23, 147, 283; 55/285, 287, 290, 302, 317, 324, 334, 337, 55/430; 241/60, 188.1, 189.1
See application file for complete search history.

(56) References Cited

U.S. PATENT DOCUMENTS

| | | | | |
|---|---|---|---|---|
| 2,970,780 A | * | 2/1961 | Bowen | 99/569 |
| 3,387,442 A | * | 6/1968 | Henson | 56/328.1 |
| 3,397,778 A | * | 8/1968 | Karlsson | 209/23 |
| 3,893,246 A | * | 7/1975 | Fleissner | 34/115 |
| 4,028,867 A | * | 6/1977 | Wolstenholme | 56/12.8 |
| 4,156,600 A | * | 5/1979 | Jacobson | 55/285 |

(Continued)

FOREIGN PATENT DOCUMENTS

FR    2421685 A  * 12/1979

*Primary Examiner* — Arpad Fabian-Kovacs
(74) *Attorney, Agent, or Firm* — Michael G. Harms

(57) ABSTRACT

A system for cleaning a flow of harvested crop including a suction device between an inlet (1) and an outlet (3), the inlet being equipped with a hood (5) in which is formed a circulation path of the flow of suction air between the inlet and a suction opening (6). The suction device further including a drum (7) rotating relative to the hood, the hood being positioned in the drum to form a suction area (10) on the exterior of the wall, the suction area being delimited circumferentially by respective upstream (10a) and downstream (10b) edges. The system further including a conveyor (11) for the flow of crop, a device (12, 13) to recover the portion of the flow of crop that is not sucked up, and a device (14, 15) to recover the portion of the flow of crop that has been sucked up in the area. The circulation path of the hood (5) forms a deflector for the flow of suction air, the deflector is arranged to balance the speed of the flow of air along the suction opening (6).

21 Claims, 3 Drawing Sheets

U.S. PATENT DOCUMENTS

| | | | |
|---|---|---|---|
| 4,662,800 A * | 5/1987 | Anderson et al. | 406/53 |
| 4,664,320 A * | 5/1987 | Steffens | 241/60 |
| 4,677,761 A * | 7/1987 | Rattner | 34/108 |
| 5,020,241 A * | 6/1991 | Fleissner | 34/115 |
| 5,481,862 A * | 1/1996 | Wassenhoven | 57/301 |
| 5,498,206 A * | 3/1996 | Underwood et al. | 460/14 |
| 6,358,141 B1 * | 3/2002 | Stukenholtz et al. | 460/100 |
| 6,936,095 B2 * | 8/2005 | North | 96/403 |

\* cited by examiner

CLEANING SYSTEM FOR A CROP FLOW

The invention relates to a system for cleaning a flow of harvested crop material and a harvesting machine including such a cleaning system.

The invention is applied to the mechanised harvesting of fruit growing on trees or bushes planted in rows, such as grapes, berries, coffee berries, olives and other fruit, in particular fruit growing in bunches.

Conventionally such fruit is harvested by a shaker assembly straddling a row of plants to detach the crop. The flow of crop obtained is then conveyed into the machine to be stored in at least one hopper provided for this purpose or in an associated trailer.

However, because of the action of the shaker assembly, the flow of harvested crop includes, in addition to the detached fruit, in particular juice, leaves, wood particles, and bunches of fruit of various sizes. To eliminate the components other than fruit, in particular leaves and wood particles, harvesting machines include a cleaning system that is adapted to eliminate said components from the 0flow by suction before it is stored.

In particular, a suction device can be disposed above the conveyor taking the flow of harvested crop from the shaker assembly to the storage facility, the suction force being controlled to remove from the flow the maximum of components other than fruit without eliminating the harvested fruit and juice that are to be stored.

In a conventional implementation, the suction device includes a rotor with blades for circulating a flow of suction air between an inlet and an outlet, the portion removed from the flow being sucked into said inlet to be ground up by the rotor and then eliminated into the flow of air that is evacuated through the outlet.

In this embodiment the particular problem arises of producing the rotor so that it is able to provide its dual function of suction and grinding. In particular, to limit wear during grinding, the rotor must be specially conceived, as much in relation to its geometry as in relation to its mechanical strength, which can compromise its aerodynamic performance. Moreover, because of the inevitable wear of the rotor, the suction force varies in time and it therefore cannot be guaranteed that its adjustment for the removal of a maximum of components other than fruit will remain appropriate.

Moreover, evacuating the ground material with the flow of suction air gives rise to the problem of polluting the crop. The flow of eliminated air must be directed downward to prevent spreading the ground material. However, the flow of air then throws up a cloud of dust that in particular is deposited on the adjacent rows of plants, which have not yet been harvested.

There is also known from the document FR-2 421 685 a separator of leaves and light debris that is located above the crop flow conveyor and includes a suction hood inside a rotary mesh cylinder.

However, there is no provision for this separator to adjust the suction force to remove the maximum components other than fruit from the flow without eliminating harvested fruit and juice.

Indeed, the suction rotor being disposed laterally relative to the hood, the suction force of the hood is not constant over the width of the conveyor. Thus an adjustment of the suction force to eliminate components other than fruit in the proximal portion of the hood leads to non-elimination of said components in its distal portion. Likewise, increasing the suction force to eliminate components other than fruit in the distal portion of the hood leads to excessive elimination of fruit in its proximal portion.

Furthermore, the document FR-2 421 685 does not take into account the problem of leaves and debris sticking to the mesh cylinder, which can lead to an imbalance of the suction force along the hood, or even loss of suction, because of the resulting blocking of said cylinder.

The invention aims to improve on the prior art by proposing in particular a cleaning system which can be reliably adjustable to remove from the flow a maximum of components other than fruit without eliminating the harvested fruit and juice and overcomes the problems of polluting the crop and the special production of a combined suction and grinding rotor.

To this end, according to a first aspect, the invention proposes a system for cleaning a crop flow, said system being adapted to be mounted on a fruit harvesting machine, said system including a suction device provided with means for circulating an air flow between an inlet and an outlet of said device, said inlet being equipped with a hood that provides a flow path for the suction air between said inlet and a suction opening formed on the wall of said hood. The suction device further includes a drum having a perforated wall, and a means for rotating said drum relative to said hood, said hood being positioned inside said drum so that the suction opening faces the wall of said drum to form a suction area on the exterior of said wall, said suction area being delimited angularly by respective upstream and downstream edges as defined relative to the rotation sense of said drum. The system further comprises a conveyor for conveying the crop flow in front of the upstream edge of the suction area, a device facing the suction area to recover the portion of the flow of crop that is not sucked up in said area, and a device facing the downstream edge of said suction area to recover the portion of the flow of crop that has been sucked up in said area. Furthermore, the circulation path of the hood incorporates means forming a deflector for the flow of suction air, said means being arranged to balance the speed of said flow of air along the suction opening.

According to a second aspect, the invention proposes a fruit harvesting machine comprising a motorized support structure and a harvesting assembly mounted on said structure, said harvesting assembly being operable to detach the crop, said machine further comprising such a system for cleaning, said system being arranged for receiving the crop flow coming from the harvesting assembly.

Other objects and advantages of the invention will become apparent in the following description given with reference to the accompanying Figures, in which.

Figure 1:
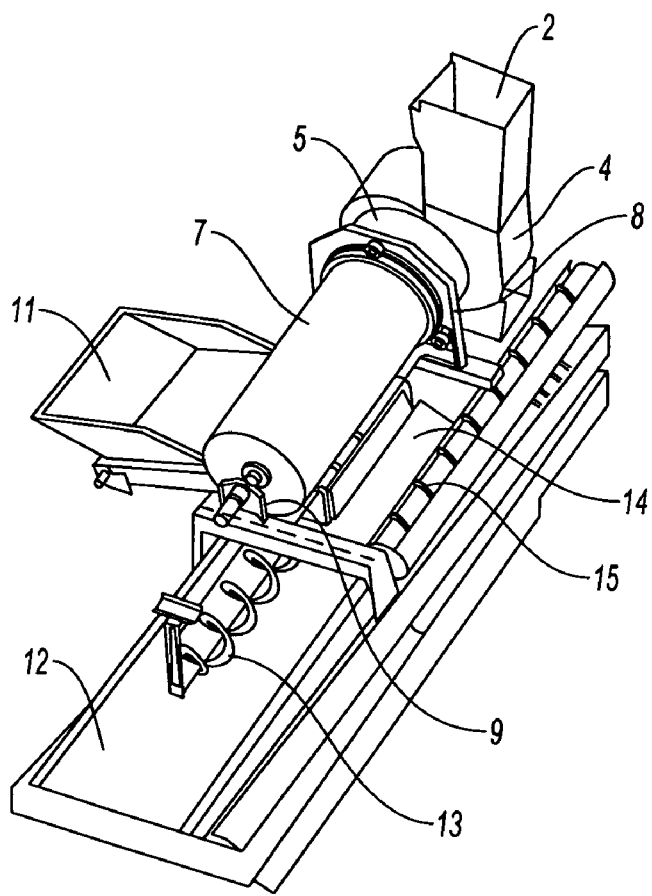
FIG. 1 is a perspective view from above of a cleaning system of an embodiment of the invention.

The invention relates to a fruit harvesting machine, in particular to a harvester for the mechanized harvesting of grapes, in particular with a view to their subsequent vinification. A harvester conventionally includes a motorized support structure that is equipped with a driver station and a harvesting assembly or system mounted on said structure.

The harvester is designed to straddle at least one row of vines so that, as it moves, the vine stocks are introduced successively into the harvesting system, which is adapted to detach the fruit. To this end, the harvesting system includes vine shakers, in particular a row of shakers provided on each side of the space into which the vine stocks are introduced.

The harvester also includes a system for continuously recovering the detached crop that contains, in addition to detached grapes G, in particular juice, leaves F, wood particles, and bunches of various sizes. In one embodiment, the system comprises two bucket conveyors adapted to recover the detached fruit under the introduction space and to convey said fruit into the upper part of the harvester.

In the context of vinification of grapes, it is desirable to eliminate components other than fruit beforehand, in particular at the harvesting stage. To this end, the harvester includes a system for cleaning the flow of crop coming from the bucket conveyors to eliminate components other than fruit, such as leaves F and wood particles. In particular, two cleaning systems can be mounted on the harvester each fed by a respective bucket conveyor.

There is described hereinafter with reference to the Figures a system for cleaning the flow of crop according to the invention, said system including a suction device that is provided with means for circulating a suction airflow Fa between an inlet 1 and an outlet 2 of said device.

In the Figures, the circulation means include a rotor 3 which has blades, said rotor being driven in rotation about a longitudinal axis. The rotor 3 is housed in a casing 4 in which are formed the inlet 1 and the outlet 2, respectively in a longitudinal direction and in an upper transverse direction.

The inlet 1 is equipped with a hood 5 in which is formed a path for circulation of the suction airflow Fa between the inlet 1 and a suction opening 6 formed in the wall of the hood 5. In particular, the suction opening 6 extends longitudinally relative to the inlet 1 from a proximal edge 6a toward a distal edge 6b, i.e. the rotor 3 is disposed laterally relative to the suction opening 6.

In the Figures, the suction opening 6 is formed in the lower portion of the wall of the hood 5, having a substantially rectangular geometry. Moreover, the upper portion of the wall of the hood 5 has a substantially cylindrical geometry.

The suction device further includes a drum 7 the wall of which is perforated and means for rotating said drum relative to the hood 5. To enable installation of the suction device in the harvesting machine, a mounting frame is provided, said frame having in particular two longitudinally spaced bearings 8, 9 for guiding rotation of the drum 7.

The rotation axis of the drum 7 is parallel to that of the rotor 3, and these two rotation axes can in particular coincide. In the Figures, the drum 7 has a circular cylindrical geometry, for example being produced from a perforated metal plate that is curved on itself.

The hood 5 is positioned inside the drum 7, in particular with the suction opening 6 extending longitudinally along the rotation axis of the drum 7, so that the opening 6 faces the wall of said drum to form a suction area 10 on the outside of said wall. To this end, the perforations in the drum 7 are adapted to allow the suction airflow Fa to pass through but not the sucked up portion of the crop flow. Thus this portion of the crop is stuck to the suction area 10 and rotated by the drum 7 without being introduced into the inlet 1 for grinding.

The suction area 10 is delimited circumferentially by upstream and downstream edges 10a, 10b, respectively, as defined relative to the rotation direction of the drum 7. In the embodiments shown, the two edges 10a, 10b extend longitudinally as a projection of the geometry of the opening 6 over substantially the full length of the wall of the drum 7, the angle between said edges being about 40°.

The cleaning system also includes a conveyor 11 for the flow of crop coming from the harvesting system, said conveyor being positioned relative to the drum 7 so that said flow is facing the upstream edge 10a of the suction area 10. In particular, the conveyor 11 includes a driven belt 11a, the width of which is substantially equal to the longitudinal dimension of the suction area 10, said conveyor feeding the flow of crop perpendicularly to the rotation axis of the drum 7.

In the embodiments shown, the downstream shaft 11b of the conveyor 11 is fastened to the guide bearings 8, 9 of the drum 7, substantially in vertical alignment with the upstream edge 10a of the suction area 10. Accordingly, upon ejection of the flow of crop beyond the conveyor 11, the difference in lift between on the one hand the juice and the fruit components and on the other hand the components other than fruit is such that the latter stick to the suction area 10.

The components to be stored then drop into a recovery device that is positioned facing the suction area 10. In the embodiments shown, the recovery device includes a hopper 12 disposed under the suction area 10, said hopper being equipped with an auger 13 for distributing the components inside it. As an alternative, the flow portion that is not sucked up can be recovered in a separator device, in particular a destemmer device, before being stored.

The components sucked up in the vicinity of the upstream edge 10a of the suction area 10 are conveyed by the drum 7 along said area to its downstream edge 10b, beyond which the suction force is no longer applied. It is then possible, by providing a device facing the downstream edge 10b, to recover the portion that is sucked up after it is detached. In the embodiment shown, recovery is effected by gravity and a receptacle 14 is provided in vertical alignment with the downstream edge 10a, said receptacle being equipped with a trough provided with an auger 15 for conveying components other than fruit longitudinally toward the rear of the harvesting machine.

The cleaning system of the invention therefore eliminates the constraints on the structure of the rotor 3 in relation to its grinding function, and prevents pollution as well because components other than fruit are rejected to the exterior of the hopper 12 at a speed that is very low compared to that of the suction airflow Fa. Furthermore, the airflow Fr rejected via the outlet 2 can be oriented upward to avoid raising any dust. The cleaning system can optionally also be equipped with a system for drying the rejected airflow Fr.

The invention proposes a circulation path of the hood 5 that incorporates deflector means for the suction airflow, said means being arranged to even out the speed of said airflow along the suction opening 6. Thus, in particular if the opening 6 has a large longitudinal dimension so as to be able to clean the flow of crop over the whole of the width of the conveyor 11, evening out the speed maintains a substantially constant suction force between the proximal edge 6a and the distal edge 6b of the opening 16. As a result of this the suction force can be adjusted for optimum elimination of components other than fruit over the whole of the width of the conveyor 11.

Figure 5:
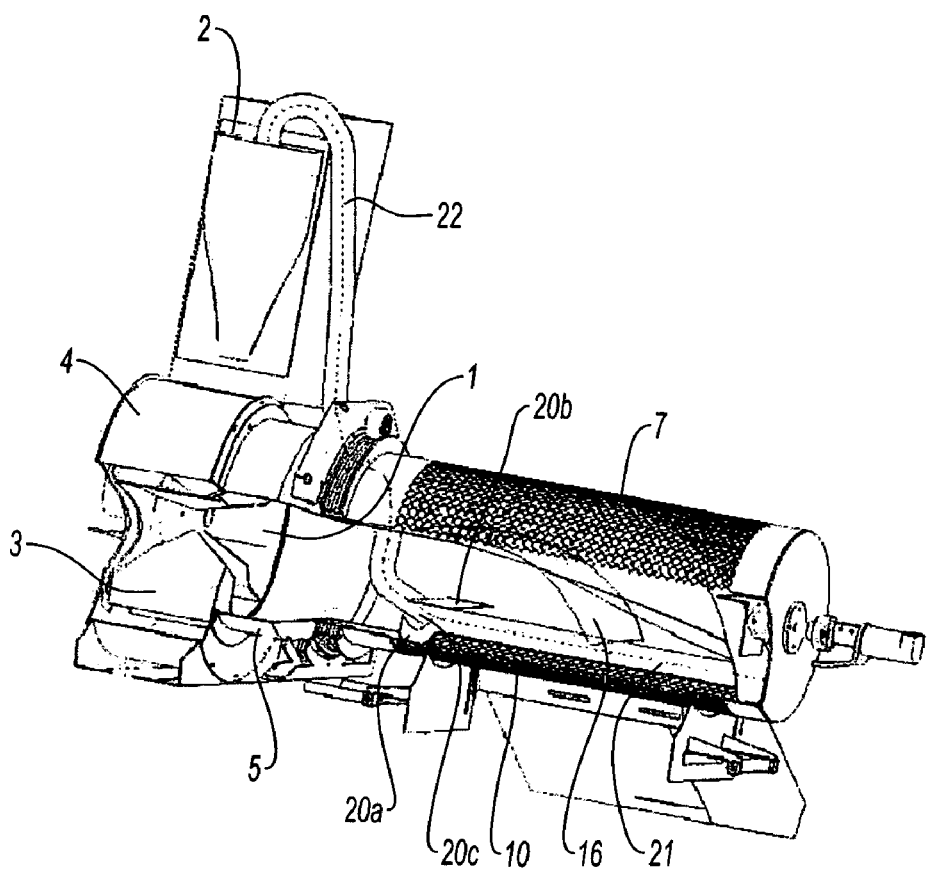
FIG. 5 is a partially cut away perspective view of the suction device represented in FIGS. 1 and 3.
Figure 6:
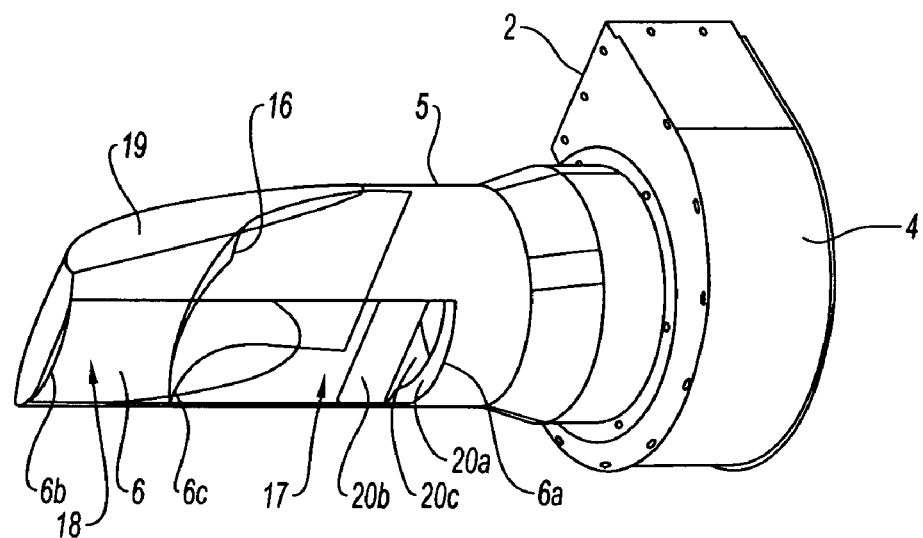
FIG. 6 is a perspective view showing more particularly deflectors inside the hood of the suction device from FIG. 5.

Referring to FIGS. 5 and 6, the interior of the hood 5 is equipped with a central deflector 16 adapted to separate the circulation path into two sub-paths. The central deflector 16 can be produced by a sheet metal plate attached by welding across the full width of the interior of the hood 5. In particular, the sub-paths are formed to enable circulation of the suction airflow between the inlet 1 and a proximal portion 17 and a distal portion 18 of the suction opening 6.

Thus the suction forces of the proximal portion 17 and the distal portion 18 can be decoupled so as to limit the impact of their position relative to the inlet 1. In particular, the circulation sub-paths are arranged so that the suction airflow has substantially the same speed in the proximal portion 17 and the distal portion.

In the embodiments shown, the proximal portion 17 and the distal portion 18 are substantially the same length. To this end, the central deflector 16 has a concave surface facing the inlet 1, said surface extending downward from an upper area facing the proximal edge 6a of the opening 6 toward a lower area facing the central portion 6c of said opening. In this embodiment, the distal sub-path is above the central deflector 16 and the proximal sub-path is below said deflector.

According to a second feature, relating to evening out the suction forces along the suction opening 6, the distal wall of the hood 5 is arranged to reduce the volume of the distal sub-path relative to the volume of the proximal sub-path.

In the embodiments shown, a depression 19 is formed on either side of the distal upper portion of the wall of the hood 5. This embodiment increases the speed of the airflow in the distal sub-path and therefore increases the suction force in the distal portion 18.

According to a third feature, relating to evening out the suction forces along the suction opening 6, the proximal edge 6a of the opening 6 is equipped with at least one proximal deflector 20 that is arranged to reduce the speed of the suction airflow in the vicinity of said proximal edge. Although the three features—central deflector 16, depression 19 and proximal deflector 20—are shown in combination in the Figures, they can be used independently to even out the suction forces in the proximal portion 17 and the distal portion 18 of the suction opening 6.

In the embodiments shown, the proximal edge 6a is equipped with a transverse deflector 20a inside the hood 5, said transverse deflector being extended by a longitudinal deflector 20b facing the opening 6. The deflectors 20a, 20b are disposed to form a small orifice 20c in the vicinity of the proximal edge 6a.

To be more precise, the transverse deflector 20a to which the rectangular geometry transverse deflector 20b is fixed has a banana-shaped geometry so as to form the small orifice 20c between said geometries.

Another aspect of the invention proposes a cleaning system preventing clogging of the drum 7 by components, in particular leaves F, that would remain stuck to its exterior wall beyond the suction area 10, in particular because of the juice in which the flow of crop is steeped. To this end, the device for recovering the sucked up portion includes means for unsticking said portion downstream of the downstream edge 10b of the suction area 10.

In the Figures, the cleaning system incorporates the deflector means 16, 19, 20 as well as the unsticking means so as to be able to combine their effects to make the elimination of the components other than fruit as reliable as possible. However, these means can be used independently, as a function of specific constraints of the envisaged application.

Figure 2:
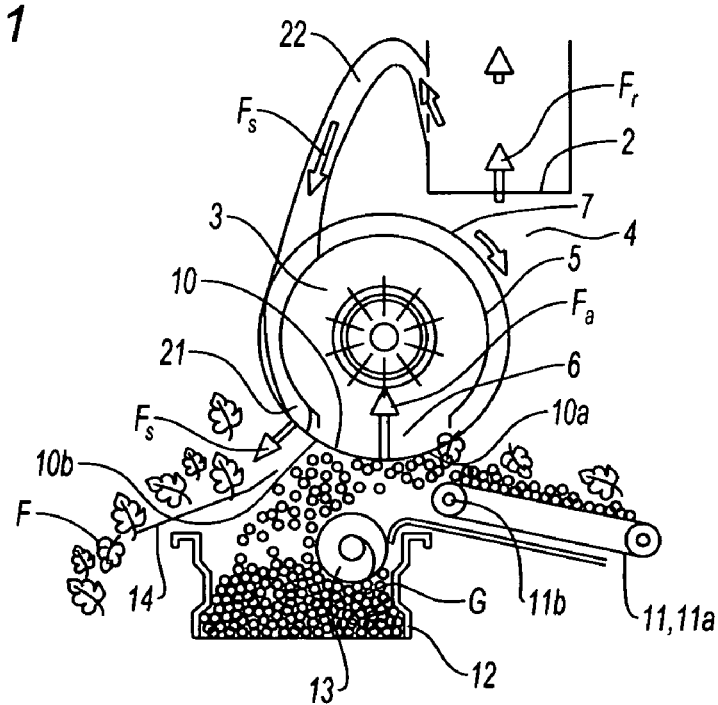
FIG. 2 is a side view showing diagrammatically the operation of the cleaning system of FIG. 1.

In FIGS. 1 and 2, the unsticking means include a nozzle 21 for blowing air onto the wall of the drum 7. The nozzle 21 is advantageously in communication with the outlet 2 of the suction device via a pipe 22 so as to have the benefit of a flow Fs of blowing air.

Furthermore, the nozzle 21 is extending downstream of the downstream edge 10b of the suction area 10, in particular over the full length of said edge; said nozzle is disposed to produce a flow Fs of blowing air directed onto the interior wall of the drum 7. Thus air is blown in the unsticking direction and allows the recovery of the sucked crop flow via the receptacle 14.

Figure 3:
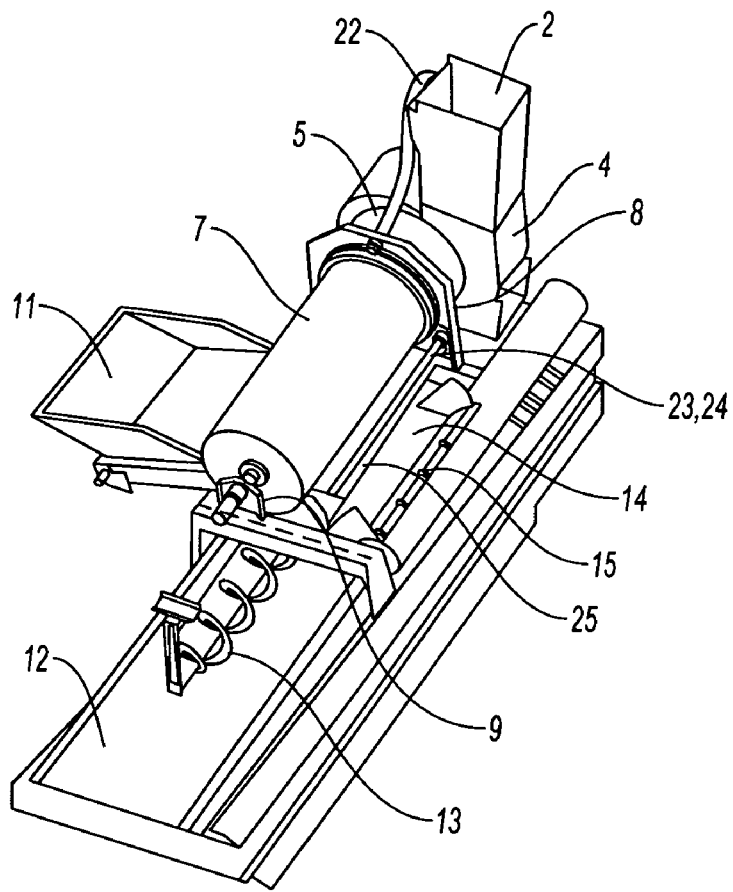
FIGS. 3 and 4 are views respectively analogous to those of FIGS. 1 and 2 of a cleaning system of another embodiment of the invention.
Figure 4:
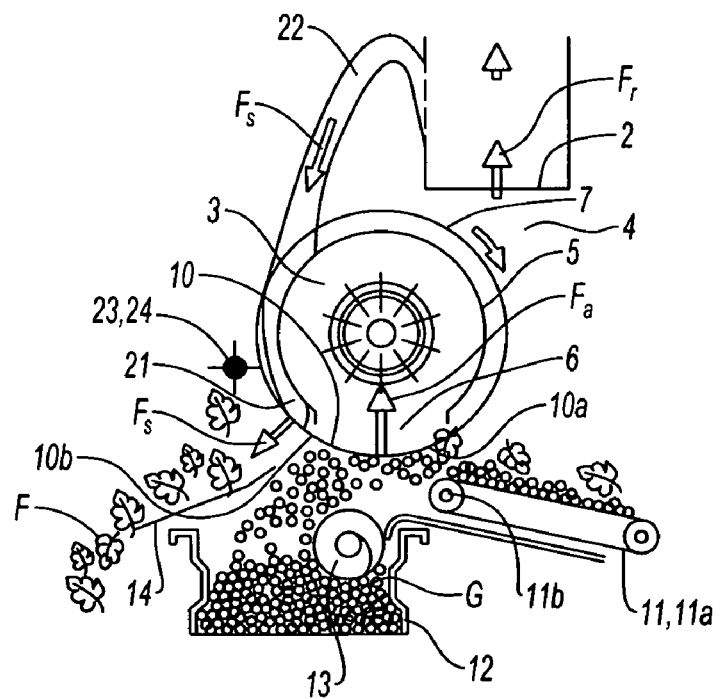

In FIGS. 3 and 4, the unsticking means further include a member 23 downstream of the blower nozzle 21 rubbing on the exterior wall of the drum 7. As an alternative, the rubbing member 23 can be independent of the blower nozzle 21.

The member 23 shown takes the form of a rotary shaft 24 provided with four paddles that contact the outside of the drum. The paddles can take the form of a flexible canvas flap. The motorized shaft 24 turns in the same sense as the drum 7, preferably at a higher speed than said drum. The shaft 24 can be driven by rollers supporting the drum 7, for example.

The invention claimed is:

1. A system for cleaning a crop flow, said system being adapted to be mounted on a fruit harvesting machine, said system including:
    a suction device comprising:
    means (3) for circulating an air flow between an inlet (1) and an outlet (2) of said device, said inlet being equipped with a hood (5) that provides a flow path for the suction air between said inlet and a suction opening (6) formed on the wall of said hood; and
    a drum (7) having a perforated wall, and a means for rotating said drum relative to said hood, said hood being positioned inside said drum so that the suction opening (6) faces the wall of said drum to form a suction area (10) on the exterior of said wall, said suction area being delimited angularly by respective upstream (10a) and downstream (10b) edges as defined relative to the rotation sense of said drum;
    a conveyor (11) for conveying the crop flow in front of the upstream edge (10a) of the suction area(10);
    a device (12, 13) facing the suction area (10) to recover the portion of the flow of crop that is not sucked up in said area; and
    a device (14, 15) facing the downstream edge (10b) of said suction area to recover the portion of the flow of crop that has been sucked up in said area,
    wherein the circulation path of the hood (5) incorporates means (16, 19, 20) forming a deflector for the flow of suction air, said means forming a deflector being arranged to balance the speed of said flow of air along the suction opening (6).

2. A system for cleaning according to claim 1, wherein the suction opening (6) extends longitudinally in the drum (7) in the direction of the rotation axis of said drum.

3. A system for cleaning according to claim 1, wherein the suction opening (6) extends longitudinally from a proximal edge (6a) toward a distal edge (6b) relative to the inlet (1) of the suction device.

4. A system for cleaning according to claim 1, wherein the suction opening (6) is formed on the lower portion of the wall of the hood (5).

5. A system for cleaning according to claim 1, wherein the conveyor (11) feeds the flow of crop perpendicularly to the rotation axis of the drum (7).

6. A system for cleaning according to claim 1, wherein the means for circulating the flow of air includes a rotor (3) the rotation axis of which is parallel to the rotation axis of the drum (7).

7. A system for cleaning according to claim 1, wherein the means forming a deflector includes a central deflector (16) that is arranged to divide the circulation path into two sub-paths, said sub-paths being formed to circulate the suction airflow between the inlet (1) and a proximal portion (17) and a distal portion (18) of the suction opening (6).

8. A system for cleaning according claim 7, wherein the circulation sub-paths are arranged so that the suction airflow has substantially the same speed in the proximal part (17) and the distal part (18).

9. A system for cleaning according to claim 7, wherein the distal sub-path is formed above the central deflector (16), the proximal sub-path being formed below said deflector.

10. A system for cleaning according to claim 7, wherein the central deflector (16) has a concave surface facing the inlet, said surface extending downward from an upper area facing the proximal edge (6a) of the opening (6) toward a lower area facing the central portion (6c) of said opening.

11. A system for cleaning according to claim 7, wherein the distal wall of the hood (5) is adapted to reduce the volume of the distal sub-path relative to the volume of the proximal sub-path so as to increase the speed of the airflow in said distal sub-path.

12. A system for cleaning according to claim 11, wherein the upper portion of the wall of the hood (5) his a substantially cylindrical geometry on the distal portion of which there is formed at least one depression (19).

13. A system for cleaning according to claim 1, wherein the proximal edge (6a) of the opening is equipped with at least one proximal deflector (20) of the means forming a deflector that is arranged to reduce the speed of the suction airflow in the vicinity of said proximal edge.

14. A system for cleaning according to claim 13, wherein the proximal edge (6a) of the opening is equipped with a transverse deflector (20a) of the means forming a deflector that is extended by a longitudinal deflector (20b) facing the opening (6), said deflectors being disposed to form a small orifice (20c) in the vicinity of said proximal edge.

15. A system for cleaning according to claim 1, wherein the device for recovering the sucked up portion includes a means (21, 22) for unsticking said portion downstream of the downstream edge (10b) of the suction area (10).

16. A system for cleaning according to claim 15, wherein the means for unsticking comprises a member (23) for rubbing against the exterior wall of the drum (7).

17. A system for cleaning according to claim 16, wherein the rubbing member (23) comprises a rotary shaft 24 provided with four paddles (23) that contact the exterior of the drum (7).

18. A system for cleaning according to claim 15, wherein the means for unsticking comprises a nozzle (21) for blowing air onto the wall of the drum (7).

19. A system for cleaning according to claim 18, wherein the blowing nozzle (21) is in communication with the outlet (2) of the suction device.

20. A system for cleaning according to claim 18, wherein the blowing nozzle (21) is disposed to produce a flow (Fs) of blowing air directed onto the interior wall of the drum (7).

21. A fruit harvesting machine according to claim 1 further including a motorized support structure and a harvesting assembly mounted on said structure, said harvesting assembly being operable to detach the crop.

* * * * *